US006959726B2

(12) United States Patent
Jervis et al.

(10) Patent No.: US 6,959,726 B2
(45) Date of Patent: Nov. 1, 2005

(54) VALVE ASSEMBLY FOR ATTENUATING BOUNCE OF HYDRAULICALLY DRIVEN MEMBERS OF A MACHINE

(75) Inventors: Mark J. Jervis, Liverpool (GB); Robert J. Valenta, Chester (GB); Lynn A. Russell, Eagle, WI (US); Sean M. Haggerty, Waukesha, WI (US)

(73) Assignee: HUSCO International, Inc., Waukesha, WI (US)

( * ) Notice: Subject to any disclaimer, the term of this patent is extended or adjusted under 35 U.S.C. 154(b) by 245 days.

(21) Appl. No.: 10/676,776

(22) Filed: Oct. 1, 2003

(65) Prior Publication Data

US 2005/0072474 A1 Apr. 7, 2005

(51) Int. Cl.[7] .............................................. F16K 15/02

(52) U.S. Cl. .............................. 137/512.1; 137/512.3; 137/514; 137/628; 60/468; 91/38

(58) Field of Search ............................ 137/512, 512.1, 137/512.3, 489, 601.2, 613, 628; 60/468, 60/469; 37/348; 91/38

(56) References Cited

U.S. PATENT DOCUMENTS 4,194,365 A 3/1980 Stoufflet et al.
4,520,625 A 6/1985 Sato et al.
4,586,332 A 5/1986 Schexnayder
4,597,410 A * 7/1986 Wilke ......................... 137/491
4,628,690 A 12/1986 Arai et al.
4,757,685 A * 7/1988 Burckhartzmeyer ......... 60/452
5,018,935 A * 5/1991 Gage .......................... 414/729
5,025,626 A 6/1991 Crosser et al.
5,048,296 A * 9/1991 Sunamura et al. ............ 60/468
6,328,275 B1 12/2001 Yang et al.
6,474,064 B1 * 11/2002 Heyne et al. ................. 60/468
6,532,738 B2 * 3/2003 Sharkness et al. ............ 60/468
6,705,079 B1 * 3/2004 Tabor et al. .................. 60/469
2002/0038548 A1 4/2002 Sharkness et al.

* cited by examiner

*Primary Examiner*—Ramesh Krishnamurthy
(74) *Attorney, Agent, or Firm*—Quarles & Brady LLP; George E. Haas

(57) ABSTRACT

A member that is driven by a hydraulic actuator tends oscillate when fluid flow to the hydraulic actuator is terminated. A pressure relief device reduces that oscillation by connecting first and second first relief valves to the hydraulic actuator. The first relief valve provides a relatively large first relief passage as long as pressure in the hydraulic actuator remains above a threshold. A second relief valve opens a second relief passage at substantially the same threshold pressure and thereafter remains open as long as the pressure remains above another lower threshold. A timer causes the second relief valve to close a given interval of time, if the pressure does not drop below the other lower threshold.

17 Claims, 2 Drawing Sheets

VALVE ASSEMBLY FOR ATTENUATING BOUNCE OF HYDRAULICALLY DRIVEN MEMBERS OF A MACHINE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulically powered equipment, and more particularly to apparatus for reducing bounce of a hydraulically driven member that is stopped suddenly.

2. Description of the Related Art

With reference to FIG. 1, a backhoe 10 is a common type of earth moving equipment that has a bucket 12 attached to the end of an arm 14 which in turn is coupled by a boom 15 to a tractor 18. A pivot joint 16 enables backhoe assembly 17 formed by the combination of the bucket, arm, and boom to pivot left and right with respect to the rear end of the tractor 18. A pair of hydraulic cylinders 19 are attached to the boom 15 on opposite sides of the backhoe tractor 18 and provide the drive force for the pivotal action. Hydraulic fluid is supplied to the cylinders 19 through control valves that are manipulated by the backhoe operator. The pivotal movement of the boom 15 is referred to as “swing” or “slew”.

As the boom 15 slews, pressurized fluid is introduced into one chamber of each cylinder, referred to as the “driving chamber”, and fluid is drained from the other cylinder chamber, referred to as the “exhausting chamber”. Due to the mass of the boom and any load being carried, a significant amount of kinetic energy is associated with its motion. When an operator terminates slewing at a rapid pace by releasing the handle attached to the control valve, the energy associated with the boom’s motion has to dissipate in order for the system to return to an “at-rest” state (the state of minimal energy). With a conventional control valve assembly, pressure in the former exhausting chambers of the swing cylinders 19 increases as the boom 15 continues to move in the driven direction, due to inertia. As this pressure continues increasing, a pressure relief valve typically is activated to prevent the cylinder pressures from reaching a dangerous level. This caused pressure in the driving cylinder chambers to decrease.

At this time point, there is a net pressure difference between the two chambers of each cylinder 19 which causes the direction of motion to reverse. As the motion reverses, the pressure relief valve closes trapping pressure in the former exhausting chambers and associated hydraulic lines. The trapped pressure begins to decay as the boom 15 now is being driven in the opposite direction which expands the former exhausting chambers and causes a rise in pressure in the former driving chambers of the cylinders. Eventually the pressure the former driving chambers becomes significantly greater than pressure in the former exhausting chambers resulting in another reversal of boom motion. The boom 15 oscillates, initially activating the pressure relief valves, but later just cycling back and forth, until the energy is dissipated to the environment through heat, sound, material hysteresis, etc. This phenomenon is known as “slew bounce” or “slew wag” and increases the time required to properly position the boom 15. As a consequence, it adversely affects equipment productivity.

Various approaches have been devised to minimize the slew bounce. For example, U.S. Pat. No. 4,757,685 employs a separate relief valve for each hydraulic line connected to the swing cylinders, which valves vent fluid to a tank return conduit when excessive pressure occurs in those cylinders. Additional fluid is supplied from the tank return conduit through a make-up valve when a cylinder chamber cavitates. This system also incorporates a means for communicating pressurized fluid from the pump supply line to the tank return conduit when an operator slew control valve is in the neutral position.

U.S. Pat. No. 5,025,626 describes a cushioned swing circuit which also has relief and make-up valves connected to the hydraulic lines for the slew cylinders. This circuit also incorporates a cushion valve which in an open position provides a fluid path between the cylinder hydraulic lines. That path includes a flow restriction orifice. The cushion valve is biased into the closed position by a spring and a mechanism opens the cushion valve for a predetermined time period when the pressure differential between the cylinder chambers exceeds a given threshold.

SUMMARY OF THE INVENTION

A hydraulic system has a pump that supplies fluid under pressure from a tank. A control valve governs the flow of the fluid from the pump to a hydraulic actuator and back from the hydraulic actuator to the tank. A pressure relief apparatus is coupled to the hydraulic actuator to reduce bounce when the control valve closes. The pressure relief apparatus comprises two relief valves connected in parallel and operating in two stages, preferably with one valve having a significantly greater flow capacity than the other valve.

The pressure relief apparatus is attached to a valve block that has a first conduit to which the hydraulic actuator connects and a second conduit through which fluid flows to the tank. A flow control assembly provides a first passage between the first conduit and the second conduit to relieve pressure in the hydraulic actuator while that pressure exceeds a first threshold. The flow control assembly provides a second passage between the first and second conduits when pressure at the first conduit exceeds a second threshold level, and remains open even though pressure at the first conduit decreases below both the first and second threshold levels.

In the preferred embodiment, the pressure relief apparatus further includes a timer valve which causes the flow control assembly to close the second passage after a given time interval regardless of pressure at the first conduit.

Preferably the pressure relief apparatus comprises a housing with a bore and first and second relief valves within the bore. The first pressure relief valve has a primary poppet that selectively engages a first valve seat to open and close the first passage. The first relief valve opens and remains open as long as pressure at the first conduit exceeds the first threshold level. The second relief valve has a bleeder poppet which engages a second valve seat to control flow through the second passage. When the second passage is closed, pressure in the first conduit acts on a smaller area of the bleeder poppet than when the second passage is open. Thus a higher pressure is needed to open the second relief valve than is required to keep it open.

DETAILED DESCRIPTION OF THE INVENTION

Figure 2:
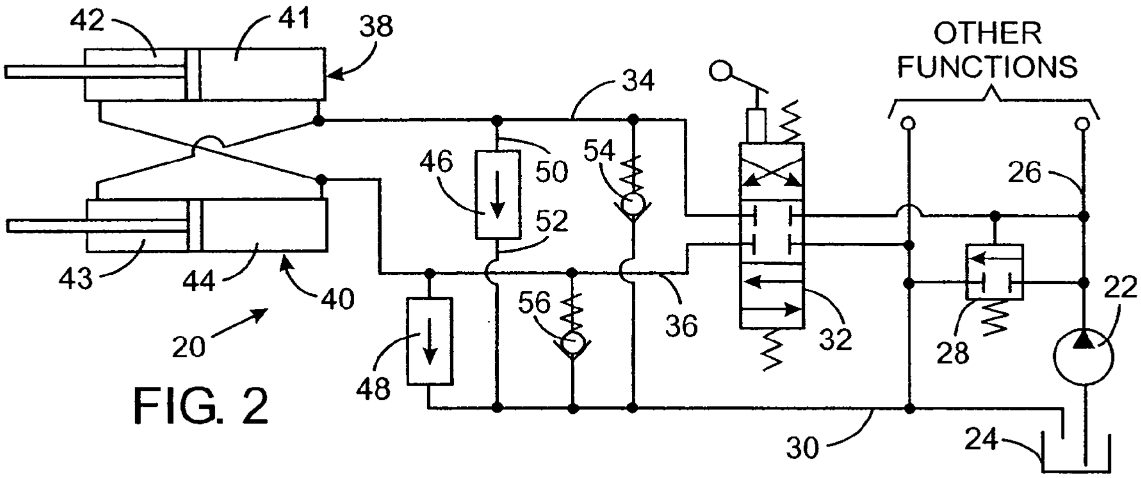
FIG. 2 is a schematic diagram of a hydraulic circuit for operating a backhoe boom, wherein the hydraulic circuit includes novel bounce reduction valves.

With reference to FIG. 2, a hydraulic circuit 20 for the backhoe 10 has a pump 22 which forces fluid from a tank 24 into a supply conduit 26. A conventional pressure relief valve 28 opens when the pump pressure exceeds a given safety threshold to relieve fluid from the supply conduit 26 to a tank return conduit 30 which conveys the fluid back to the tank 24. The supply conduit 26 and the tank return conduit 30 are connected to hydraulic circuits for a plurality of functions on the backhoe 10.

Of particular interest, the supply and tank return conduits 26 and 30 are connected to a standard three-position directional control valve 32 which is operated by the backhoe operator to swing the boom 15. The directional control valve 32 selectively couples the supply conduit 26 and the tank return conduit 30 to a pair of actuator conduits 34 and 36 which in turn are connected to ports of hydraulic actuators, such as cylinders 38 and 40, that control the swing of the boom 15. The directional control valve 32 is illustrated centered in the neutral, closed position in which the actuator conduits 34 and 36 are disconnected from the pump and tank return conduits 26 and 30.

In the exemplary hydraulic circuit, the first actuator conduit 34 is connected to the head chamber 41 of the first cylinder 38 and to the rod chamber 43 of the second cylinder 40. Similarly, the second actuator conduit 36 is connected to the rod chamber 42 of the first cylinder 38 and to the head chamber 44 of the second cylinder 40. Depending upon the position of the directional control valve 32, hydraulic fluid from the pump 22 is sent to one of the actuator conduits 34 or 36 and the other actuator conduit 36 or 34 is connected through the directional control valve to the tank return conduit 30. This action drives the cylinders 38 and 40 on opposite sides of the boom 15 to swing the boom in one direction or the other. Although the present invention is being described in terms of operating cylinders with pistons, it should be understood that the novel concepts can be used with other types of hydraulic actuators, such as a hydraulic motor with a rotating shaft.

A pair of bounce reduction valves 46 and 48, serving as separate pressure relief apparatus, are connected to the two actuator conduits 34 and 36. The first bounce reduction valve 46 has an inlet port 50 connected to the first actuator conduit 34 and an outlet port 52 directly coupled to the tank return conduit 30. Similarly the second bounce reduction valve 48 has an inlet port connected to the second actuator conduit 36 and an outlet port coupled to the tank return conduit 30. The first bounce reduction valve 46 opens when the pressure in the first actuator conduit 34 exceeds a threshold level and thereafter conducts fluid to tank return conduit 30, as will be described in greater detail. Similarly, the second bounce reduction valve 48 opens when the pressure in the second actuator conduit 36 exceeds the given threshold and conveys hydraulic fluid to the tank return conduit 30.

A first conventional anti-cavitation valve 54 is placed between the tank return conduit 30 and the first actuator conduit 34. A second anti-cavitation valve 56 is located between the tank return conduit 30 and the second actuator conduit 36. These anti-cavitation valves 54 and 56 open when the pressure in the respective actuator conduit 34 or 36 is less than the pressure in the tank return conduit 30, as results from cavitation in a cylinder chamber connected to the respective actuator conduit 34 or 36.

Figure 4:
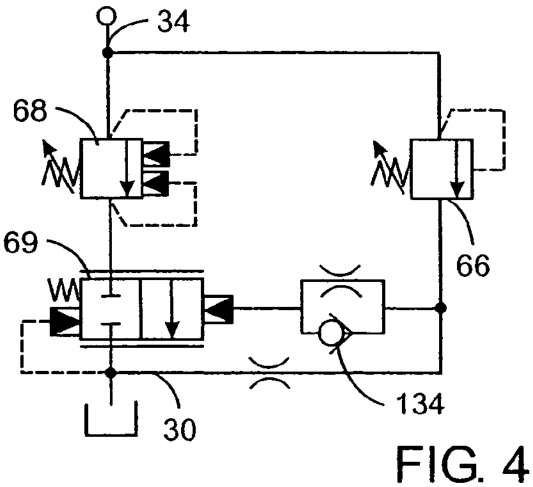
FIG. 4 is a schematic diagram of the bounce reduction valve.
Figure 3:
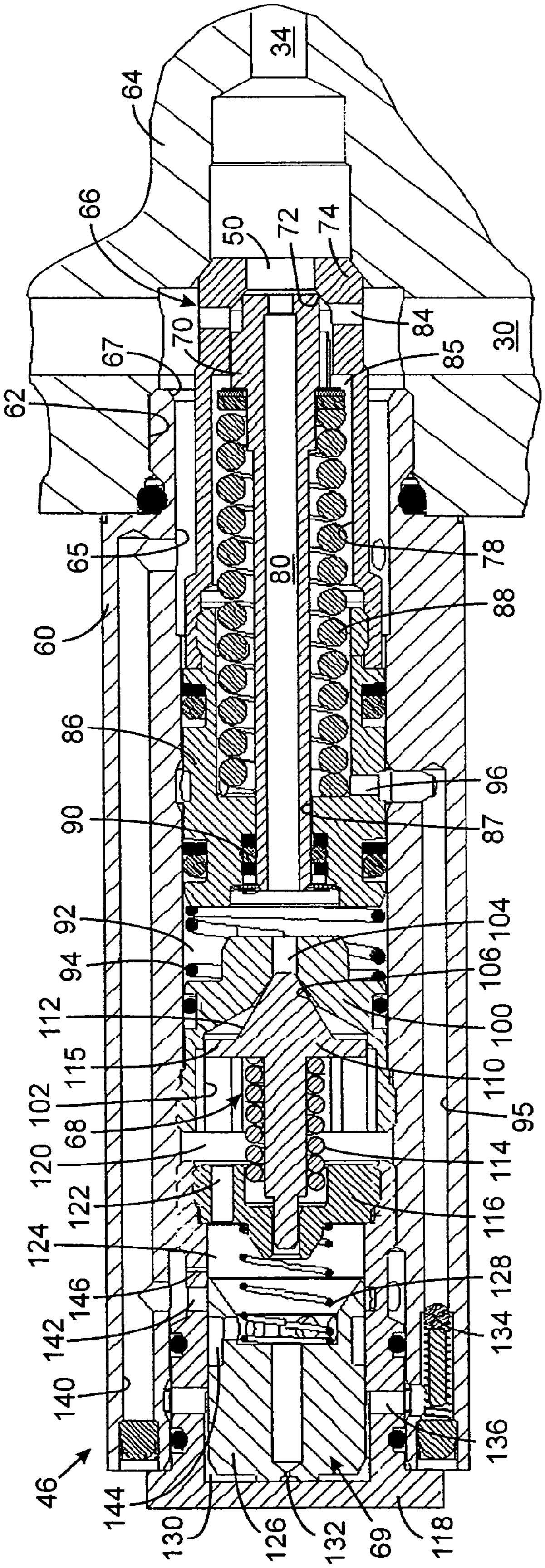
FIG. 3 is a cross-section view through a bounce reduction valve in the closed state.

FIG. 3 illustrates a physical embodiment of the first bounce reduction valve 46 with the understanding that the second bounce reduction valve 48 has an identical construction. FIG. 4 schematically depicts the components of that bounce reduction valve. The first bounce reduction valve 46 has a housing 60 which is threaded into an aperture 62 in a valve block 64 through which pass portions of the tank return conduit 30 and the two actuator conduits 34 and 36. The aperture 62 for the first bounce reduction valve 46 communicates with the first actuator conduit 34 and the tank return conduit 30. The corresponding aperture for the second bounce reduction valve 48 communicates with the second actuator conduit 36 instead of the first actuator conduit 34.

The valve housing 60 has a bore 65 extending there through with an opening which forms a housing outlet port 67 into the tank return conduit 30. A first relief valve 66 and a second relief valve 68 are located one behind the other within the housing bore 65. A timer valve 69 is located within the bore 65 on a remote side of the second relief valve 68 from the first relief valve 66 and acts as a hydraulic timer, as will be described. As will be described, the first relief valve 66 opens and closes in response to pressure at the inlet port 50, and the second relief valve 68 opens in response to that inlet pressure and closes due to either that pressure decreasing to the reset level (FIG. 4) or the operation of the timer valve 69.

The first relief valve 66 includes a nose member 74 that is secured within the housing bore 65 and engages the valve block 64 to close communication between the first actuator conduit 34 and the tank return conduit 30. The nose member 74 has a central bore 78 with the inlet port 50 providing a passage between the central bore and the first actuator conduit 34. Several nose outlet ports 84 extend laterally through a wall of the nose member 74, forming paths from the central bore 78 to the tank return conduit 30. The nose outlet ports 84 and the opening 65 of the housing bore 62 combine to form the outlet port 52 of the first bounce reduction valve 46 in FIG. 2. The interior end of the nose member 74 is closed by a cap 86 that is threaded therein to provide an extension of the central bore 78. An internal chamber 85 is created in the central bore 78 on one side of the cap 86 and an intermediate chamber 92 is formed on the opposite side of the cap. The cap 86 has a lateral aperture 96 providing a fluid path between the central bore 78 and a feed passage 95 in the housing 60.

An elongated tubular primary poppet 70 of the first relief valve 66 is slidably received in the central bore 78 of the nose member 74 and engages a first valve seat 72 when the first relief valve 66 is in the closed state. An aperture 80 extends longitudinally through the primary poppet 70 and forms a passageway between the inlet port 50 and the intermediate chamber 92 in the housing bore 65 between the two relief valves 66 and 68. A valve spring 88 biases the primary poppet 70 away from the cap 86 and into engagement with the first valve seat 72 on the nose member 74 thereby closing the inlet port 50. The tubular primary poppet 70 slideably projects through an aperture 87 in the cap 86 and a seal 90 prevents hydraulic fluid from flowing between the nose chamber 85 and the intermediate chamber 92.

The second relief valve 68 has a body 100 which is threaded into the bore 65 of housing 60. A spacer spring 94 within the intermediate chamber 92 biases the cap 86 away from the second relief valve body 100 thereby forcing the nose member 74 against the valve block 64. The second relief valve body 100 has a secondary bore 102 from which a control aperture 104 opens through a second valve seat 106 into the intermediate chamber 92. A bleeder poppet 110 has a conical surface 112 which moves with respect to the second valve seat 106 to open and close the control aperture 104 and thus the second relief valve 68. The conical surface 112 is surrounded by a guide ring 115 having a circumferential surface that loosely engages the wall of the secondary bore 102. The bleeder poppet 110 is biased into engagement with the second valve seat 106 by a bleeder spring 114. The bleeder spring 114 engages a disk 116 secured in the open internal end of a plug 118 that closes the open end of the housing bore 65 with O-rings providing a seal there between.

A control chamber 120 is created between the second relief valve body 100 and the disk 116, and a timer chamber 124 is formed on the opposite side of the disk within the plug 118. A passage 122 extends through the disk 116 from the control chamber 120 to the timer chamber 124. The timer chamber 124 and the control chamber 120 can be considered as a single control chamber because of their interconnection through the disk passage 122.

The timer valve 69 comprises a timer spool 126 located within the timer chamber 124 and able to slide within the plug 118 against the force of a timing spring 128 that biases the timing spool away from the disk 116. The timing spool 126 defines a dwell chamber 130 at the innermost portion of the plug 118. A timer orifice 132 extends through the timing spool 126, providing a restricted fluid path between the dwell chamber 130 and the timer chamber 124.

The plug 118 has a transverse aperture 136 extending between the dwell chamber 130 and the feed passage 95 leading through the valve housing 60 to the lateral aperture 96 in the nose member 74. The transverse aperture 136, feed passage 95, and the lateral aperture 96 form a passageway between the dwell chamber 130 and the nose chamber 85. A check valve 134, located in the feed passage 95, allows fluid to flow in that passage only in a direction from the nose chamber 85 to the dwell chamber 130.

A tank passage 140 also extends longitudinally through the valve housing 60. The plug 118 has a second transverse aperture 142 which provides a path between the tank passage 140 and the timer chamber 124 which path is selectively opened and closed by movement of the timing spool 126, as will be described. The other end of the tank passage 140 opens into a section of the valve housing bore 65 around the nose member 74 and thus communicates through the housing outlet port 67 with the tank return conduit 30.

System Operation

Figure 1:
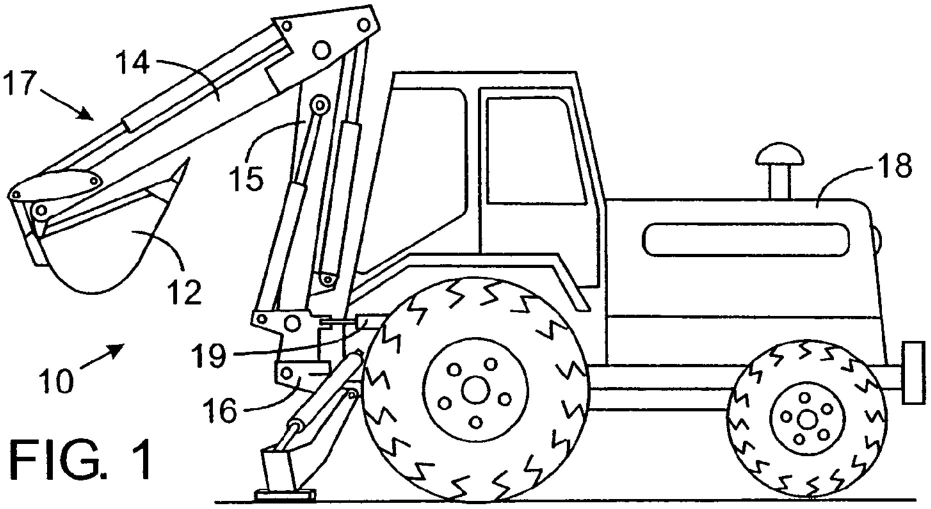
FIG. 1 is a side view of a backhoe incorporating the present invention.

This novel bounce reduction valve 46 is employed to reduce slew bounce in the backhoe 10. With reference to FIGS. 1 and 2, assume that the backhoe boom 15 is being operated wherein pressurized hydraulic fluid from the pump 22 is flowing through the directional control valve 32 into the second actuator conduit 36. That fluid continues to flow from the second actuator conduit 36 into cylinder chambers 42 and 44. At the same time other fluid is exhausting from cylinder chambers 41 and 43 through the first actuator conduit 34 and control valve 32 into the tank return conduit 30.

When the operator places the directional control valve 32 into the neutral, closed position, the inertial load of the backhoe assembly 17 exerts force on the cylinders 38 and 40. This action increases the pressure in cylinder chambers 41 and 43 That increasing pressure is communicated through the first actuator conduit 34 to the inlet port 50 of the first bounce reduction valve 46.

Referring to FIGS. 3 and 4, the increasing actuator pressure at the inlet port 50 is applied to the nose of the primary poppet 70 for the first relief valve 66. When that pressure reaches a first threshold level, the primary poppet 70 cracks open allowing fluid to flow from the first actuator conduit 34 through the nose outlet ports 84 into the tank return conduit 30. Movement of the primary poppet 70 away from the valve seat 72 raises pressure in the internal nose chamber 85 to an intermediate pressure level that is between the pressure levels in the first actuator conduit 34 and the tank return conduit 30. The nose outlet ports 84 are sized to restrict fluid flow to create the intermediate pressure. That intermediate pressure level is communicated through the feed passage 95 where it causes the check valve 134 to open thereby introducing that pressure into the dwell chamber 130 behind the timing spool 126.

Prior the first relief valve 66 opening, the timing spool 126 closed the second transverse aperture 142 in the plug 118. As a consequence, fluid was essentially trapped in the control chamber 120 behind the bleeder poppet 110 of the second relief valve 68, as only a small aperture 146 existed between that chamber and the tank passage 140. However, now the pressure in the dwell chamber 130 increases to a level which causes the timing spool 126 to move away from the end wall of the plug 118 until it contacts the disk 116. The initial motion of the timing spool 126 forces fluid into the timer chamber 124 through the bleed orifice 132, thereby enabling the timing spool to move toward the disk 116. Further movement of the timing spool 126 aligns its side passage 144 with the second transverse aperture 142 thereby opening that aperture that leads to the tank passage 140 and onward through the housing outlet port 67 to the tank return conduit 30. This path exhausts the fluid flowing from the timer chamber 124 and the control chamber 120.

The ongoing boom motion causes pressure in the first actuator conduit 34 to continue to rise until the set point of the second relief valve 68 is reached. That increased pressure is conveyed via the poppet's longitudinal aperture 80 into the intermediate chamber 92 and the control aperture 104 in the second relief valve body 100 where the pressure is applied to the tip of the bleeder poppet 110. The increased pressure causes the bleeder poppet 110 to unseat. In the open state of the second relief valve 68, an additional amount of fluid from the inlet port 50 flows through the control chamber 120, disk passage 122 and the timer chamber 124. That fluid is exhausted from the timer chamber 124 via second transverse aperture 142 and the tank passage 140 into the tank return conduit 30. This further relieves the pressure in the actuator conduit 34 and the associated chambers of cylinders 38 and 40.

Pressure in the intermediate chamber 92 acting on the relatively small tip area of the bleeder poppet in control aperture 104 must exceed a second threshold to open the second relief valve 68, against the force of the bleeder spring 114. The second threshold pressure level preferably is substantially equal to the first threshold pressure level so that the two relief valves 66 and 68 open at approximately the same time. However, once the bleeder poppet 110 cracks open, a larger combined area of the conical surface 112 and guide ring 115 is exposed to the pressure from the intermediate chamber 92. Thus a significantly lower pressure (i.e. above a third pressure threshold) is required to maintain the second relief valve 68 open, than is required to force it open. The third pressure threshold level is less than both the first threshold level at which the first relief valve 66 opened and the second threshold level at which the second relief valve 68 opened. This characteristic is important to subsequent operation of the bounce reduction valve 46, as will be described. The operation of the present bounce reduction valve is in contrast to conventional pressure relief valves which remain open only while the pressure differential exceeds the level required to open the valve.

As the boom 15 begins to slow, the fluid flow and pressure in the first bounce reduction valve 46 decreases. In due course, the flow decreases to an amount that can pass satisfactorily through only the second relief valve 68 at which time the pressure acting on the nose of the primary poppet 70 no longer overcomes the force of valve spring 88 and the first relief valve 66 closes. The now enlarged surface area of the bleeder poppet 110 in the second relief valve 68 enables that valve to remain open at this reduced pressure. Therefore all the flow through the first bounce reduction valve 46 passes through the second relief valve 68.

While the bleeder poppet 110 is open, the pressure in the first actuator conduit 34 continues to decay until dropping below a level which enables the force of the bleeder spring 114 to reseat the bleeder poppet 110 thereby closing the second relief valve 68. The second relief valve 68 closure is independent of the amount of flow there through. This terminates all flow of fluid through the first bounce reduction valve 46.

Under normal operating conditions the pressure in the first actuator conduit 34 decreases sufficiently so that force of the bleeder spring 114 is able to close the second relief valve 68.

However, in some situations, such as when the backhoe 10 is on an angle with a full bucket, the cylinder pressure remains relatively high and the bleeder poppet 110 remains partially open. As a result, the boom assembly 17 continues to move slowly, or drift, after motion damping has occurred. In the absence of a specific mechanism to constrain this drift movement, the boom assembly 17 continues to swing until striking mechanical stops at the extreme end of its travel. To address this situation, the present bounce reduction valves 46 and 48 integrate the timer valve 69 on the tank passage 140 to force the bleeder poppet 110 against seat 106 should drifting occur.

The timer valve 69 operates as follows. When the first relief valve 66 closes, pressure in its internal nose chamber 85 drops to the same level as in the tank return conduit 30. That relatively low pressure level is communicated through the feed passage 95 and causes the check valve 134 to close. That closure traps fluid in the dwell chamber 130 behind the timer spool 126. The force of the timer spring 128 causes the timer spool 126 to move farther into the plug 118 as the trapped fluid bleeds through the timer orifice 132. That movement progressively decreases the opening between the timer chamber 124 and the second transverse aperture 142 which provides a path into the longitudinal passage 140 leading to the tank return conduit 30. The amount of time required for the timer spool 126 to fully close the second transverse aperture 142 is a function of the volume of trapped oil, the timer spring force and the size of the timer orifice 132.

During normal operation, as when the backhoe 10 is on flat ground, the relatively slow operation of the timer valve 69 does not affect reseating of the bleeder poppet 110, which occurs solely in response to the inlet port pressure. That is the pressure at the inlet port 50 decreases to a relatively low level at which the bleeder poppet 110 reseats before the timer valve 69 closes the opening into the second transverse aperture 142.

However, when the cylinder pressures prevent normal reseating of the bleeder poppet 110, operation of the timer valve 69 produces closure of the second relief valve 66. As fluid in the dwell chamber 130 is displaced through timer orifice 132, the spring bias causes the timer spool 126 to continues moving farther into the plug 118, thereby reducing the opening into the second transverse aperture 142. Eventually, that opening decreases to a "critical orifice" area with a large pressure drop there across. As a result, pressure starts to increase in the timer chamber 124 and acts on the back side of the bleeder poppet 110 along with the force of the bleeder spring 114. In due course, enough pressure builds in the timer chamber 124 to force the bleeder poppet 110 against the second valve seat 106. This forced reseating effectively and consistently terminates any drifting that occurs. It should be noted that the distance that the boom 15 travels while drifting is controlled by the designed operating time of the timer valve 69.

The timer spool 126 travels the remainder of its stroke until bottoming out in a rest position in which the second transverse aperture 142 is fully closed.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A pressure relief apparatus for reducing bounce of a hydraulic actuator, the pressure relief apparatus comprising:

a valve block with a first conduit for connection to the hydraulic actuator and a second conduit through which fluid is exhausted; and a flow control assembly connected to the valve block, wherein the flow control assembly provides a first passage between the first conduit and the second conduit while pressure at the first conduit exceeds a first threshold and provides a second passage between the first conduit and the second conduit when pressure at the first conduit exceeds a second threshold level, the second passage being maintained open as long as pressure at the first conduit is greater than a third threshold level which is less than both the first threshold level and the second threshold level.

2. The pressure relief apparatus as recited in claim 1 wherein the first threshold level is substantially equal to the second threshold level.

3. The pressure relief apparatus as recited in claim 1 wherein the flow control assembly comprises:

a first relief valve which opens to provide the first passage between the first conduit and the second conduit; and a second relief valve which opens to provide the second passage between the first conduit and the second conduit.

4. The pressure relief apparatus as recited in claim 3, wherein the first relief valve comprises a primary poppet which selectively engages and disengages a valve seat between the first conduit and the second conduit to open and close the first passage.

5. The pressure relief apparatus as recited in claim 3 wherein the second relief valve comprises a bleeder poppet which selectively engages and disengages a valve seat to open and close the second passage, wherein when the second passage is closed, pressure from the first conduit acts on a smaller area of the bleeder poppet than when the second passage is open.

6. The pressure relief apparatus as recited in claim 3 further comprising a hydraulically operated timer which causes the second relief valve to close the second passage after the second passage has been open for a predefined amount of time.

7. The pressure relief apparatus as recited in claim 3 further comprising a hydraulically operated timer which causes the second relief valve to close a given amount of time after the first relief valve closes.

8. The pressure relief apparatus as recited in claim 1 wherein the flow control assembly comprises:

a housing connected to the valve block and having a bore;

a first relief valve received in the bore and selectively engaging a first valve seat between the first and second conduits, the first relief valve disengaging from the first valve seat to open the first passage when pressure from the first conduit exceeds the first threshold;

a passageway extending between the first conduit and an intermediate chamber within the housing;

a second relief valve received in the bore and selectively opening and closing a fluid path between the intermediate chamber and the second conduit when pressure in the intermediate chamber exceeds a second threshold level and maintaining the fluid path open even though the pressure in the intermediate chamber decreases below the second threshold level.

9. The pressure relief apparatus as recited in claim 8 wherein the second relief valve is within the bore of the housing, and the intermediate chamber is formed in the bore between the first relief valve and the second relief valve.

10. A pressure relief apparatus which reduces bounce of a hydraulic actuator that is connected to an actuator conduit of a hydraulic system that also has a tank return conduit, the pressure relief apparatus comprising:

a housing having a bore;

a first relief valve within the bore of the housing and having an inlet port to receive fluid from the actuator conduit, the first relief valve further comprising a primary poppet selectively abutting a first valve seat and disengaging the first valve seat when pressure from the inlet port exceeds a first threshold to open a path between the inlet port and the tank return conduit;

a passageway extending between the inlet port and an intermediate chamber within the bore of the housing; and a second relief valve within the bore and opening to provide a fluid path between the intermediate chamber and the tank return conduit when pressure in the intermediate chamber exceeds a second threshold level, remaining open even though the pressure in the intermediate chamber decreases below the second threshold level.

11. The pressure relief apparatus as recited in claim 10 wherein the first relief valve comprises a primary poppet slidably located within the bore and biased against the first valve seat by a spring.

12. The pressure relief apparatus as recited in claim 10 wherein the passageway extends through the primary poppet.

13. The pressure relief apparatus as recited in claim 10 wherein the second relief valve comprises:

a body within the bore of the housing and forming the second valve seat in the fluid path between the intermediate chamber and the tank return conduit; and a bleeder poppet biased into engagement with the second valve seat, wherein pressure in the intermediate chamber acts on a smaller area of the valve member when the valve member engages the second valve seat than when the valve member is disengaged from the second valve seat.

14. The pressure relief apparatus as recited in claim 10 further comprising a hydraulic timer which causes the second relief valve to close regardless of pressure in the intermediate chamber.

15. A pressure relief apparatus which reduces bounce of a hydraulic actuator, the pressure relief apparatus comprising:

a housing having a bore;

a nose member received in the housing and defining an intermediate chamber in the bore, the nose member having internal chamber into which an inlet port and a first outlet port open, wherein a first valve seat is located between the inlet port and the first outlet port;

a primary poppet slidably received in the internal chamber of the nose member and having an aperture providing a fluid passage between the inlet port and the intermediate chamber;

a valve spring biasing the primary poppet against the first valve seat;

a body within the bore and separating the intermediate chamber from a control chamber, the body having a control aperture between the intermediate chamber and the control chamber;

a bleeder poppet within the bore of the housing and selectively opening and closing the control aperture, wherein pressure in the intermediate chamber acts on a smaller area of the bleeder poppet when the control aperture is closed than when the control aperture is open, thus a greater pressure is required in the intermediate chamber to open the control aperture than is needed thereafter to maintain that open condition; and a tank passage connecting the control chamber to a second outlet.

16. The pressure relief apparatus as recited in claim 15 further comprising a hydraulically operated timer valve which enables fluid to flow from the control chamber through the tank passage to the second outlet for a defined interval of time.

17. The pressure relief apparatus as recited in claim 15 further comprising hydraulically operated timer valve that comprises:

a timer spool moveably located in the bore with the control chamber on one side and a dwell chamber on an opposite side, the timer spool having an orifice extending between the control chamber and the dwell chamber, wherein the spool has a closed position which blocks fluid flow from the control chamber into the tank passage and has an open position which permits fluid to flow from the control chamber into the tank passage;

a feed passage connecting the internal chamber of the poppet to the dwell chamber;

a check valve in the passage allowing fluid to flow from the internal chamber of the nose member to the dwell chamber; and a timer spring biasing the timer spool into the closed position.

* * * * *